United States Patent
Sauermann

(10) Patent No.: US 8,078,985 B2
(45) Date of Patent: Dec. 13, 2011

(54) SCROLLING OF ORDERED SERIES WITH ITEM HIGHLIGHTING INDICATING RELEVANCE

(75) Inventor: Volker Sauermann, Dossenheim (DE)

(73) Assignee: SAP AG, Walldorf (DE)

( * ) Notice: Subject to any disclaimer, the term of this patent is extended or adjusted under 35 U.S.C. 154(b) by 590 days.

(21) Appl. No.: 11/142,470

(22) Filed: Jun. 2, 2005

(65) Prior Publication Data

US 2006/0277490 A1 Dec. 7, 2006

(51) Int. Cl.
*G06F 3/048* (2006.01)
(52) U.S. Cl. .................... 715/784; 715/783; 715/785
(58) Field of Classification Search .............. 715/784, 715/783, 785
See application file for complete search history.

(56) References Cited

U.S. PATENT DOCUMENTS 6,816,174 B2 * 11/2004 Tiongson et al. ............. 715/787
6,906,734 B2 * 6/2005 Subramanian et al. ........ 715/736

OTHER PUBLICATIONS

Microsoft® Outlook®, 2000 SP-3 Copyright (c) 995-1999 Microsoft Corp, pp. 1-7.*

* cited by examiner

*Primary Examiner* — Steven Sax
*Assistant Examiner* — Andrey Belousov
(74) *Attorney, Agent, or Firm* — Kenyon & Kenyon LLP

(57) ABSTRACT

A graphical user interface displays an ordered series of items. Each of the items has an index value indicating a position of the item within the series. The graphical user interface includes a scroll bar to scroll through the first ordered series. Items with index values that are outside of a first threshold range around a reference index value corresponding to a position of a slider of the scroll bar are displayed to have an appearance that is different from items having index values inside the first threshold range.

21 Claims, 12 Drawing Sheets

Set a reference index value

440

Display one or more pluralities of items with item appearances according to reference index value

460

Change reference index value

FIG. 4

SCROLLING OF ORDERED SERIES WITH ITEM HIGHLIGHTING INDICATING RELEVANCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A recurring problem with man-machine interfaces is information overload. Even a well-designed graphical interface may deliver more information than a viewer is able to absorb. As the amount of displayed information increases, the ability of a viewer to identify what information is relevant to a decision decreases. This problem is especially acute when displayed data frequently changes and the changes are visually subtle.

An example of an interface in which the relevance of data is easily lost to the viewer is an administration tool for configuring and monitoring a search engine running in a distributed hardware landscape. The user interface of such an administration tool may offer different views that display data related to specific aspects of the search engine, such as load balancing, fail over, resource consumption of the different search engine services, etc.

FIG. 1 shows a view of an administration tool that lists all currently existing trace files. Each record of a trace file may indicate a program action at a particular time. The user may select one or more trace files (e.g., selected items 101-105) to be displayed in a separate window.

Figure 2:
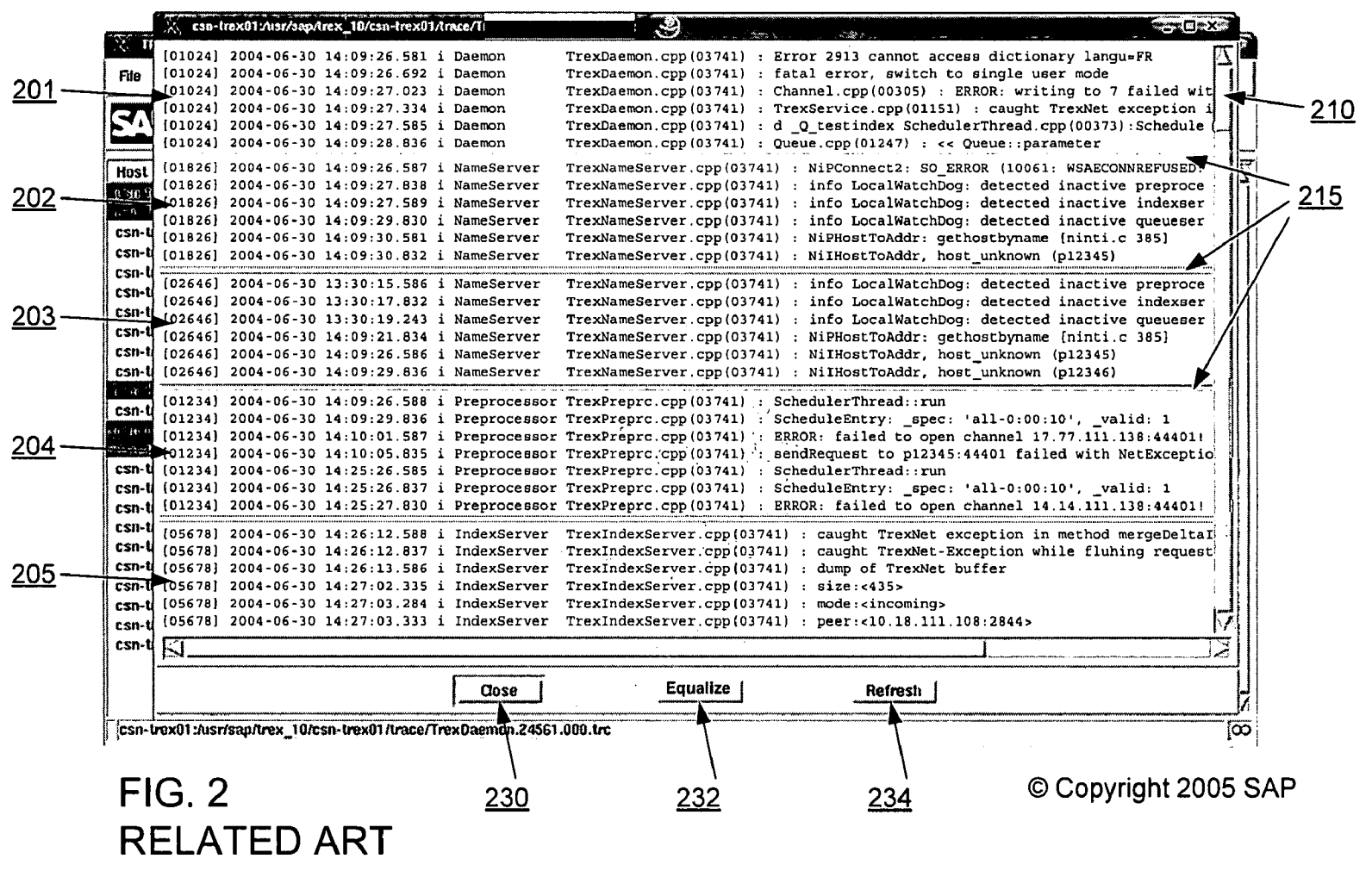

FIG. 2 shows how the five trace files selected in FIG. 1 may be displayed in one common window. The clocks on the hosts on which the search engine is running are typically all synchronized so that the trace files from different hosts may be compared. When investigating several trace files at one time, it is important to find identical or at least similar time stamps in different trace files in order to compare events. If an error is detected in one trace file, a system administrator will want to know what happened on the other services of the search engine at the same time.

The window in FIG. 2 has only one vertical scroll bar. Movement of the slider 210 of the scroll bar is translated into individual scrolling movements in each of the panes 201-205 so that similar or identical time stamps are displayed to the user. Each pane may be resized by moving a splitter bar 215; the size of the panes may be equalized by selection of an "equalize" button 232; the trace file data may be refreshed by selection of a "refresh" button 234; and the multiple pane view may be closed by selection of a "close" button 230. This interface and an architecture implementing this interface have been described in co-pending U.S. patent application Ser. No. 11/098,958 filed 4 Apr. 2005, entitled "System And Method For Scrolling Data", which is incorporated herein by reference for its explanation of how to implement the interface and architecture on a computer system.

While the interface illustrated in FIG. 2 simplifies viewer identification of time-related events by allowing trace files to be compared side-by-side, information overload increases as more trace files and panes are added, or more items are displayed in individual panes. However, selecting fewer files or displaying fewer events makes it less likely that the critical information needed to understand what happened will be displayed.

Thus, when simultaneously displaying multiple series of items side-by-side, there is a need to distinguish displayed information in a way that assists a viewer in discerning relevance.

BRIEF DESCRIPTION OF THE DRAWINGS

FIG. 1 illustrates an example interface listing trace files and permitting a user to select one or more trace files to be displayed in a separate window. This interface, while described as related art, may also be used with the present invention.

FIG. 2 illustrates a related art interface displaying the trace files selected in FIG. 1 in one common window.

FIGS. 3A-3C illustrate an example interface displaying the trace files selected in FIG. 1 in one common window, with automatic highlighting of items as each pane scrolls.

FIG. 4 illustrates an example of the display method.

DETAILED DESCRIPTION

Figure 5:
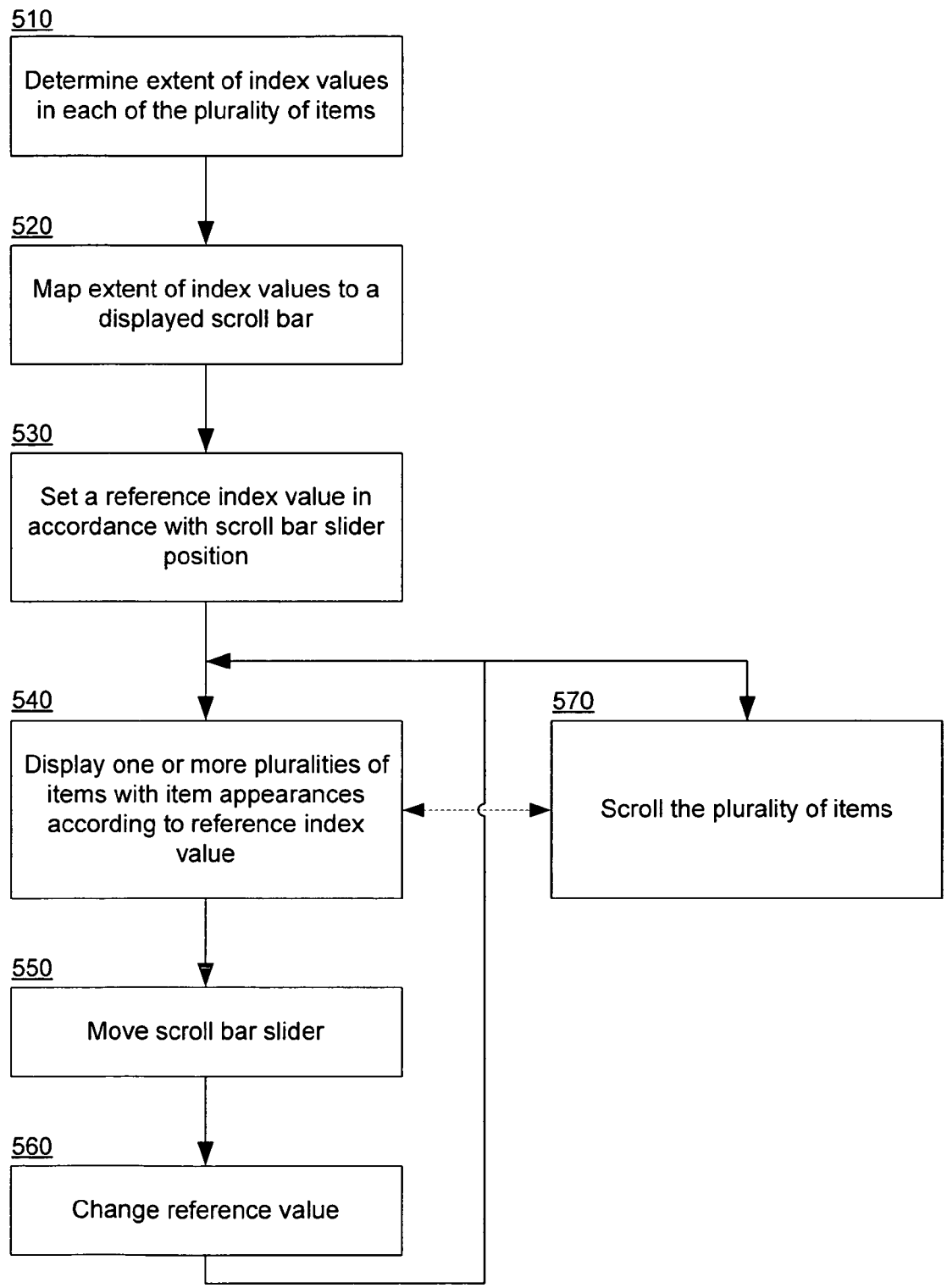
FIG. 5 is a more detailed example of the display method, adding scrolling.

Embodiments of the present invention include an interface and display method that automatically highlight items of a displayed series of items to emphasize information relevance, thereby assisting a user to more quickly assimilate relationships between displayed items. Each item is assigned an index value, such as a timestamp, indicating a position of the item within the series. As a user moves the slider of the scroll bar, slider movement is translated into a reference value. The series of items in each pane scrolls based on this reference value or based on a relative position of the scroll bar slider. As each series scrolls, item highlighting changes based on a proximity of the index value of the item to the reference value.

Figure 1:
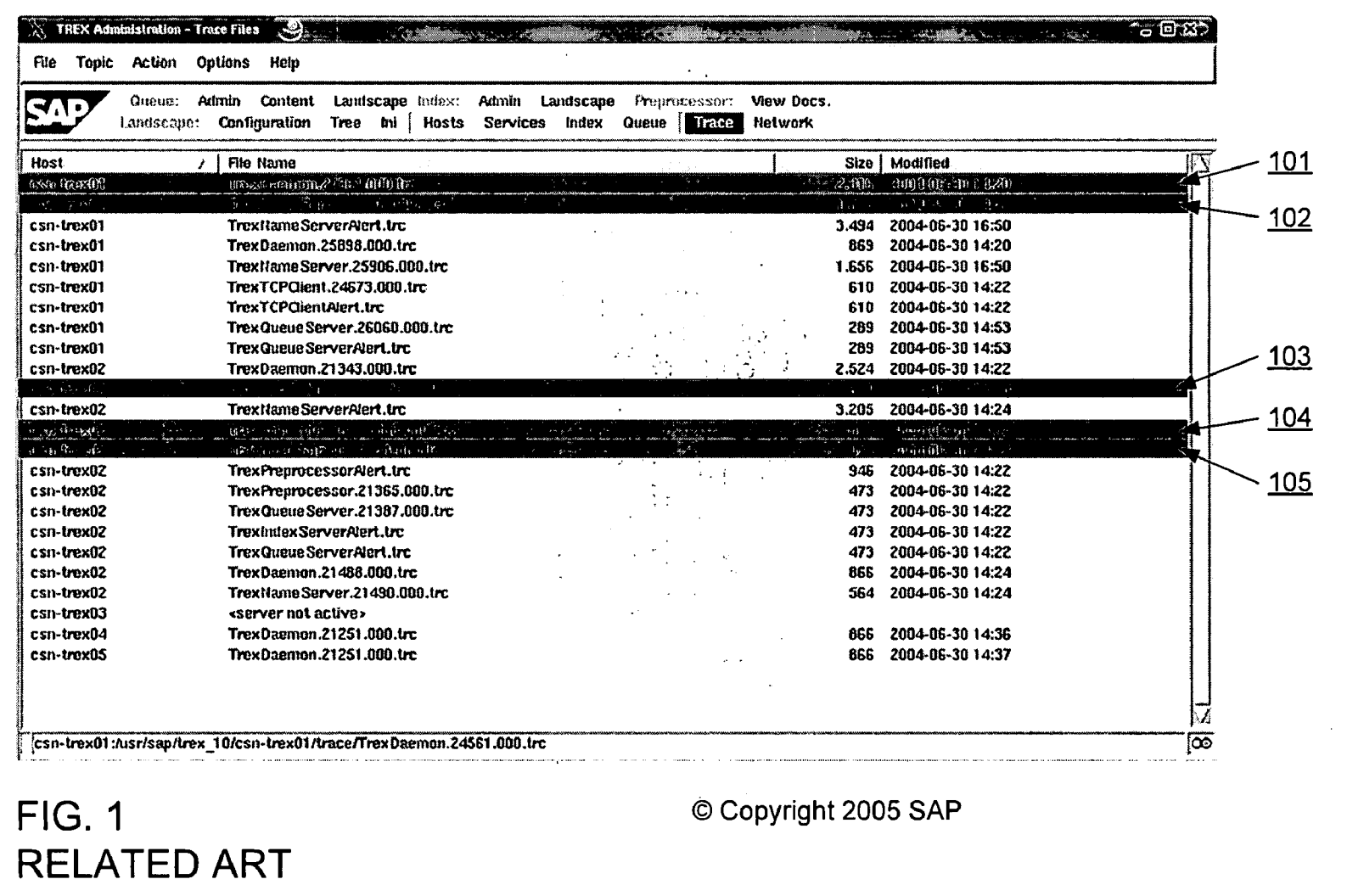
Figure 3A:
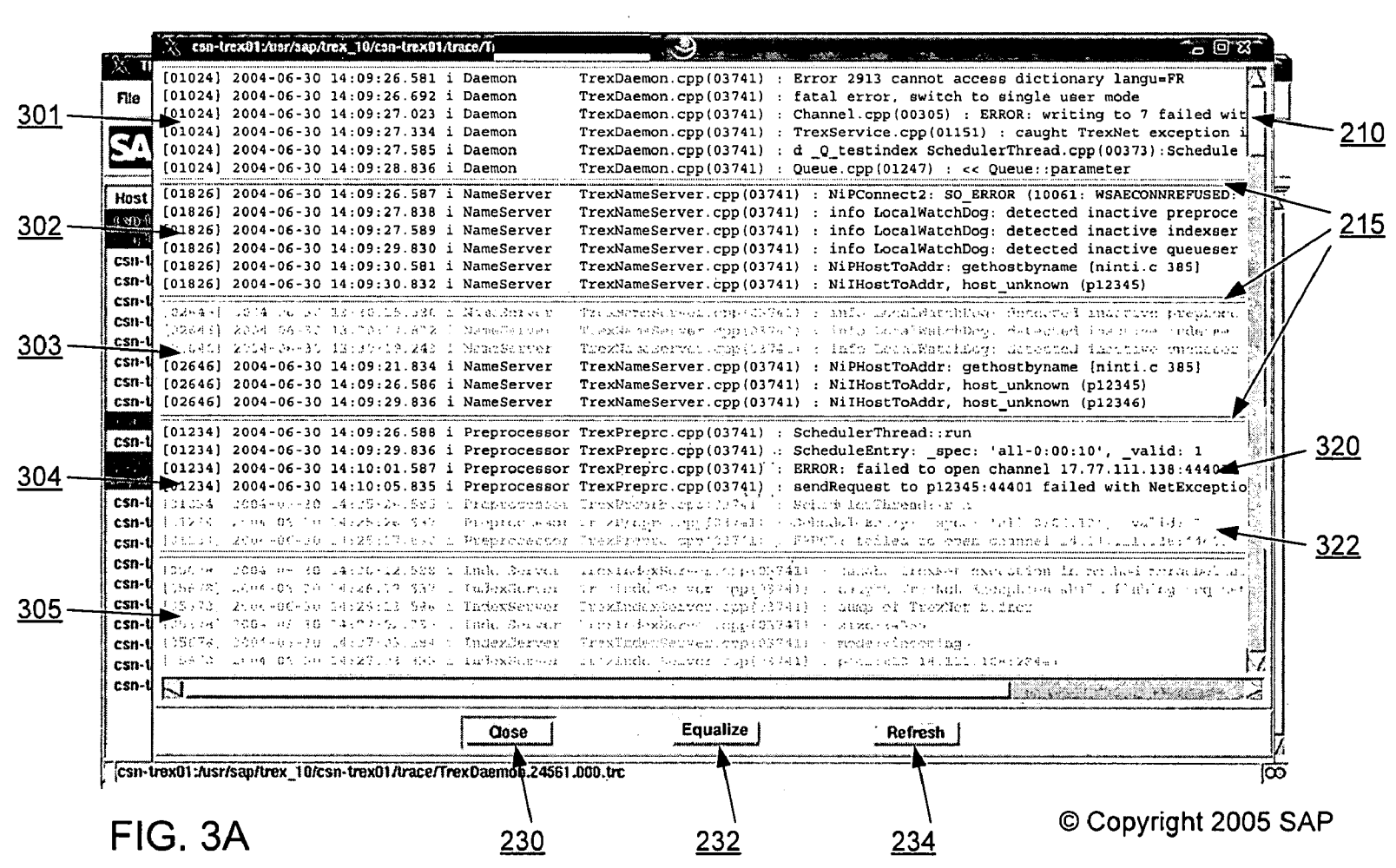
Figure 3B:
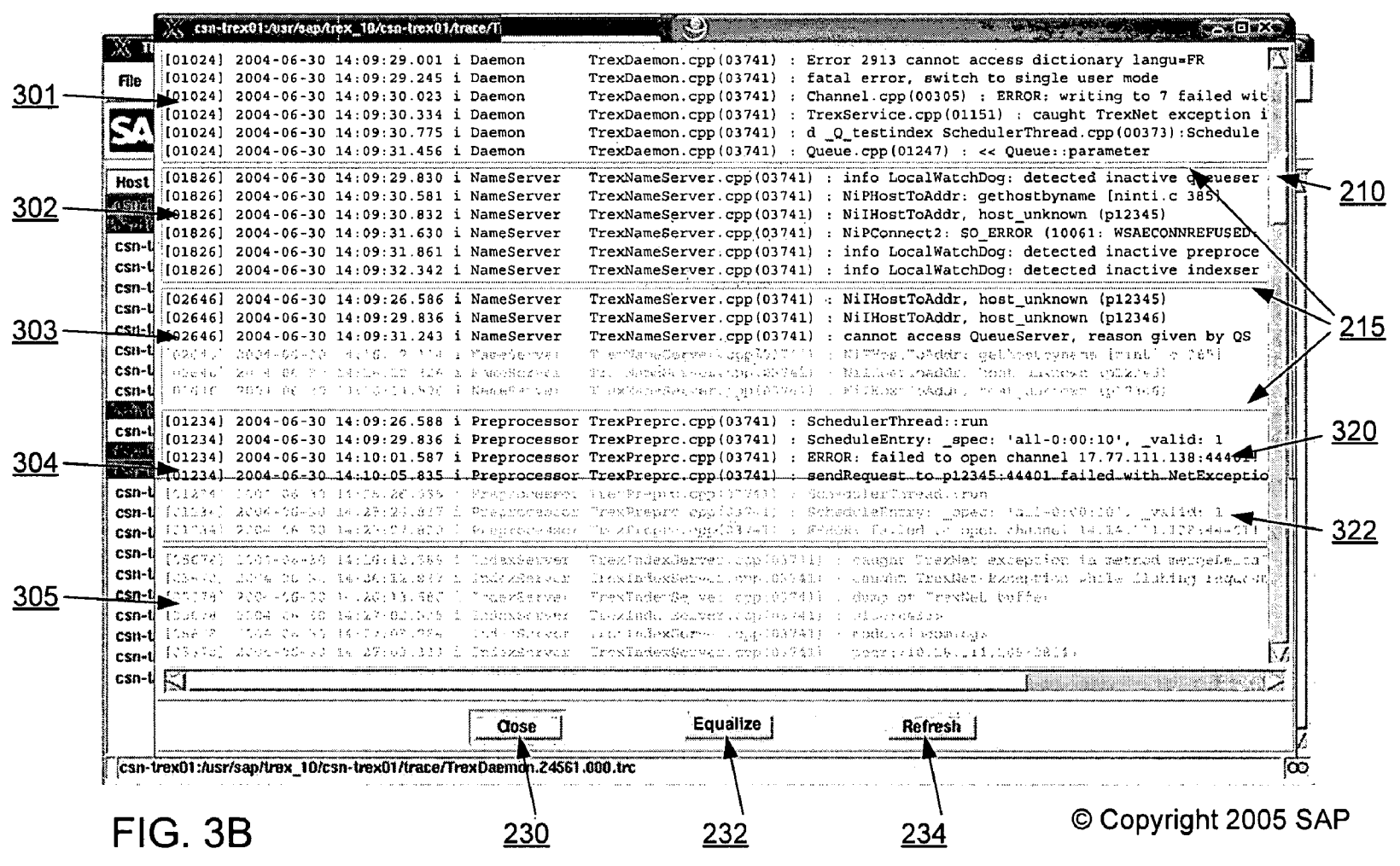
Figure 3C:
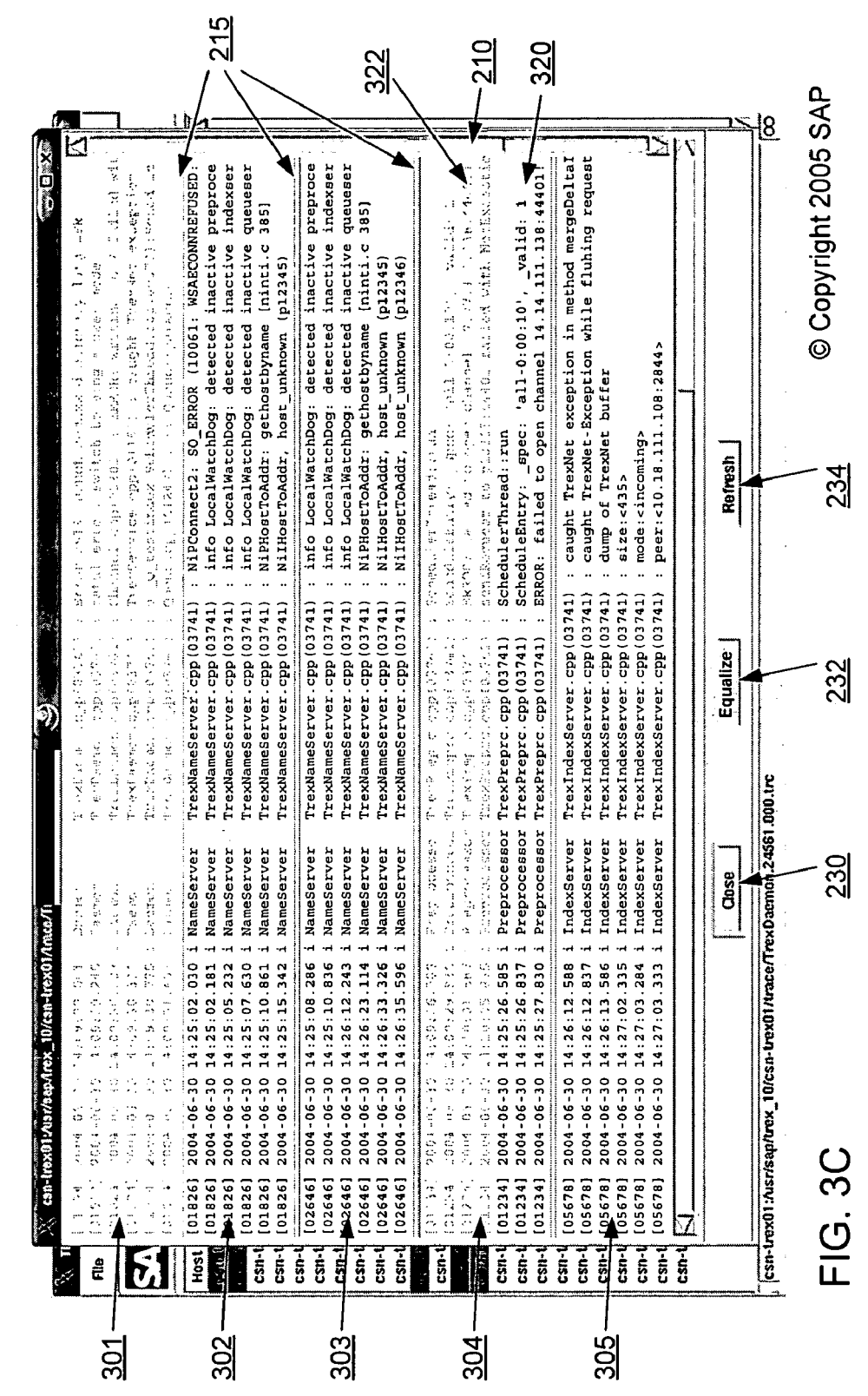

FIGS. 3A-3C illustrate an intuitive interface displaying the trace files selected in FIG. 1, but with automatic highlighting of items. A plurality of panes (301-305) each display an ordered series of items. The items in each pane are ordered by a timestamps as the index value indicating a position of the item within the respective series.

A scroll bar having a slider 210 scrolls through an extent of each ordered series. The scrolling of each series may be in accordance with a reference index value corresponding to a position of the slider 210, with movement of the slider 210 being translated into changes to the reference index value. Scrolling of each series may also be in accordance with a relative position of the slider 210 (e.g., as the slider moves from a 0% position to a 10% position, each pane scrolls through 10% of the items associated with that respective pane).

Items having an index value within a threshold range around the reference index value are rendered with an appearance (e.g., 320) that is different from items outside the threshold range (e.g., 322).

For example, if analyzing trace files from a search engine, the search engine may be configured in a way that a service (e.g., a subsystem of the search engine); is replaced within 20 seconds by a new one in case of problems. When the service goes down, any entry is automatically written to a trace file.

Likewise, when the replacement server comes up, an entry is also written to a trace file. There may be a separate trace file for each subsystem, with trace files being stored either locally at the subsystem or at a central location for the entire search engine.

Since a watchdog program will replace a bad service within 20 seconds, there is a reaction time of about 20 seconds within which errors or problems are detected and propagated within the system landscape. Therefore, in this example, it is less interesting to compare time stamps of two trace files which differ by more than about 20 seconds. Accordingly, by setting the threshold range to +/−20 seconds of the reference index value, emphasis in each of the panes is placed upon trace files within the +/−20 seconds window.

As shown in the example in FIG. 3A, the out-of-scope items (322) of trace files are displayed in a different color (here gray) than the trace file items that lie within the temporal scope of the threshold range (320). By displaying less relevant trace file items (those out of scope) in a color that provides less visual emphasis, those items are present for review but effectively "deactivated," since a viewer's eye is drawn to the darker colored in-scope lines (320). This difference in font color intuitively indicates that the out-of-scope lines are less relevant because their time stamps are not "close enough" to the time stamps displayed with the darker font color.

The particular threshold range (e.g., +/−20 seconds) may be defined in a configuration file of an administration, or by an entry field of the user interface.

There may also be more than one threshold range. For example, a plurality of thresholds may be set (e.g. at +/−10 seconds, +/−20 second, +/−40 seconds), with items having index values outside each successive threshold range having an appearance that is different from items having index values inside the respective threshold range. The difference in appearance may be a difference in color, shade of color, contrast, and/or font style (e.g., bold, italics), and items having index values outside each successive threshold range may be displayed with less visual emphasis (e.g., less contrast, less color saturation, softer font style) than items having index values inside the respective range. As a practical matter, however, more than 10 levels of appearance may be hard for a viewer to distinguish.

FIG. 3B illustrates panes 301-305 after downward movement of the slider 210. Which lines are out-of-scope (322) and which lines are in-scope (320) have changed in accordance with the movement of the slider. Each pane scrolls independently according to a relative position of the slider 210, or according to the reference index value corresponding to the position of the slider 210. In this example, panes 301, 302, and 303 have scrolled, while panes 304 and 305 have not scrolled.

FIG. 3C illustrates panes 301-305 after further downward movement of the slider 210. Some of the previously not relevant lines in FIG. 3B have now become relevant in FIG. 3C (e.g., pane 305), and vice versa (e.g., pane 301).

As demonstrated in pane 305 between FIGS. 3B and 3C, the switching of appearance is independent from actual scrolling in the pane. Rather, the switching of appearance depends upon the reference index value which is set by the position of the slider 210. For example, although pane 304 has not scrolled between FIGS. 3B and 3C, the appearance of the first four lines in pane 304 has switched from relevant in FIG. 3B to less relevant in FIG. 3C, and the last three lines have switched from less relevant in FIG. 3B to relevant in FIG. 3C.

FIG. 4 illustrates an example of the display method. At 430, the reference index value is initialized. At 440, one or more pluralities of items are displayed. Items with index values outside threshold range about the reference value are displayed with a different appearance relative to items having index values inside the first threshold range. There may also be additional threshold ranges and appearances, with appearances of items with index values outside of each successive threshold range being different from items having index values inside the respective threshold range. At 460, the reference index value changes, after which the display of the items (440) is performed again, adjusting appearances of the items in accordance with the change of the reference index value.

FIG. 5 is a more detailed example of the display method, adding scrolling. At 510, a determination is made of the extent of index values in each of the plurality of items. For example, referring back to FIG. 1, a range of the time stamps within the selected files 101-105 is used to determine the newest and oldest time stamp among all of the entries in the selected files.

At 520, the extent of the index values are mapped to a displayed scroll bar. There are several ways this may be accomplished. One way is to designate one end of the scroll bar to correspond to the upper limit of the range of index values and designate the other end to correspond to the lower limit of the range of index values, generating a linear progression of reference index values in-between as the scroll bar slider 210 moves from one end to the other. Another way is to set one end of the scroll bar to correspond to the upper limit of the range of index values and the other end to correspond to the lower limit of the range of index values, and to map each discrete index value in-between to a position of the scroll bar slider 210.

At 530, the reference index value is initialized according to a position of the slider 210 on the scroll bar. For example, if the slider 210 initially appears at the top or the bottom of the scroll bar, the reference index value is initialized to the corresponding limit.

At 540, one or more pluralities of items are displayed. Items with index values outside the first threshold range around the reference index value are displayed with a different appearance relative to the items having index values inside the first threshold range. There may be additional threshold ranges and appearances, with appearances of items with index values outside of each successive threshold range being different from items having index values inside the respective threshold range.

At 550, the position of the scroll bar slider 210 changes, with the reference index value changing (560) in accordance with the position of the slider 210. Responsive to the change of reference value, appearances of displayed items may change (540) and/or displayed items may scroll (570). A pace of scrolling through each of the plurality of items is independent of a pace of scrolling through other pluralities, in accordance with the reference index value or in accordance with a relative position of the scroll bar slider 210.

At 440 and 540, the difference in appearance may be a difference in color, shade of color, contrast, and/or font style (e.g., bold, italics), and items having index values outside each successive threshold range may be displayed with less visual emphasis (e.g., less contrast, less color saturation, softer font style) than items having index values inside the respective range.

FIGS. 6A-6D are schematic representations of items from five series placed on an axis in sorted order according to each item's index value. In this example, the axis and type of index values are time. This schematic also illustrates the independent scrolling of each series.

Referring to 6A, the reference index value 610 appears at the left of the axis at a limit of the extent of index values. Items within the first threshold range $dT_1$ (620) are illustrated as being within box 630. In this example, there are five display panes (e.g., 301-305), with each pane displaying pane up to display six items.

Figure 6A:
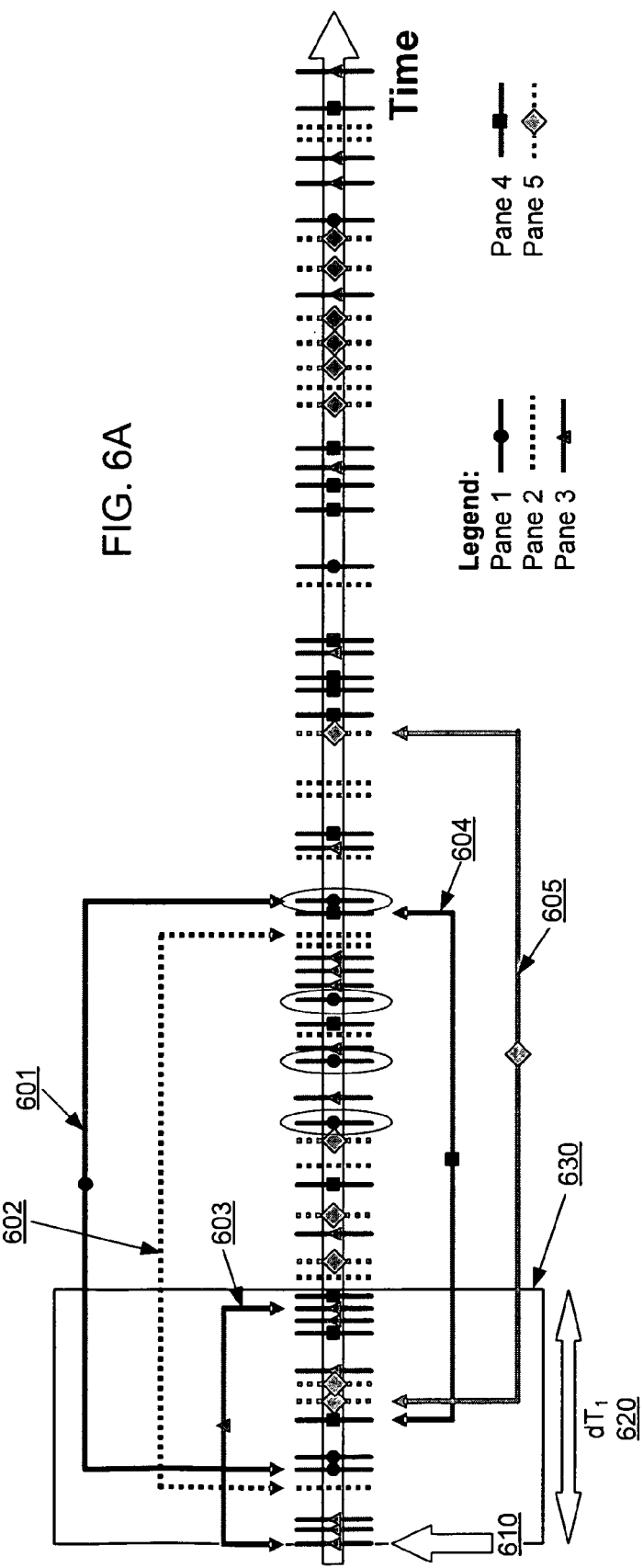
FIGS. 6A-6D are schematic representations of items from five series placed on an axis in sorted order according to each item's index value.

Bracket 601 illustrates which six items will appear in Pane 1. In FIG. 6A, two items of the series displayed in Pane 1 appear within box 630, and four items appear outside box 630. Accordingly, the two items within box 630 will be displayed with an appearance (320) that is different from the appearance (322) of items outside box 630. Similarly, bracket 602 illustrates which six items will appear in Pane 2; bracket 603 illustrates which six items will appear in Pane 3; bracket 604 illustrates which six items will appear in Pane 4; and bracket 605 illustrates which six items will appear in Pane 5. Although each of the panes in this example displays a same number of items, the number of items per pane may be different, e.g., if a pane is resized by moving a splitter bar 215.

In FIG. 6A, Panes 1, 2, 4, and 5 have items with index values both inside and outside the first threshold range $dT_1$ (620), whereas all of the items in Pane 3 have index values within $dT_1$ (620). Other arrangement may occur, such as having more items of a single series within $dT_1$ (620) than can be simultaneously displayed in the corresponding pane (e.g., bracket 603 for Pane 3 in FIG. 6B); or having every item: within a single series occurring outside $dT_1$ (620).

Figure 6B:
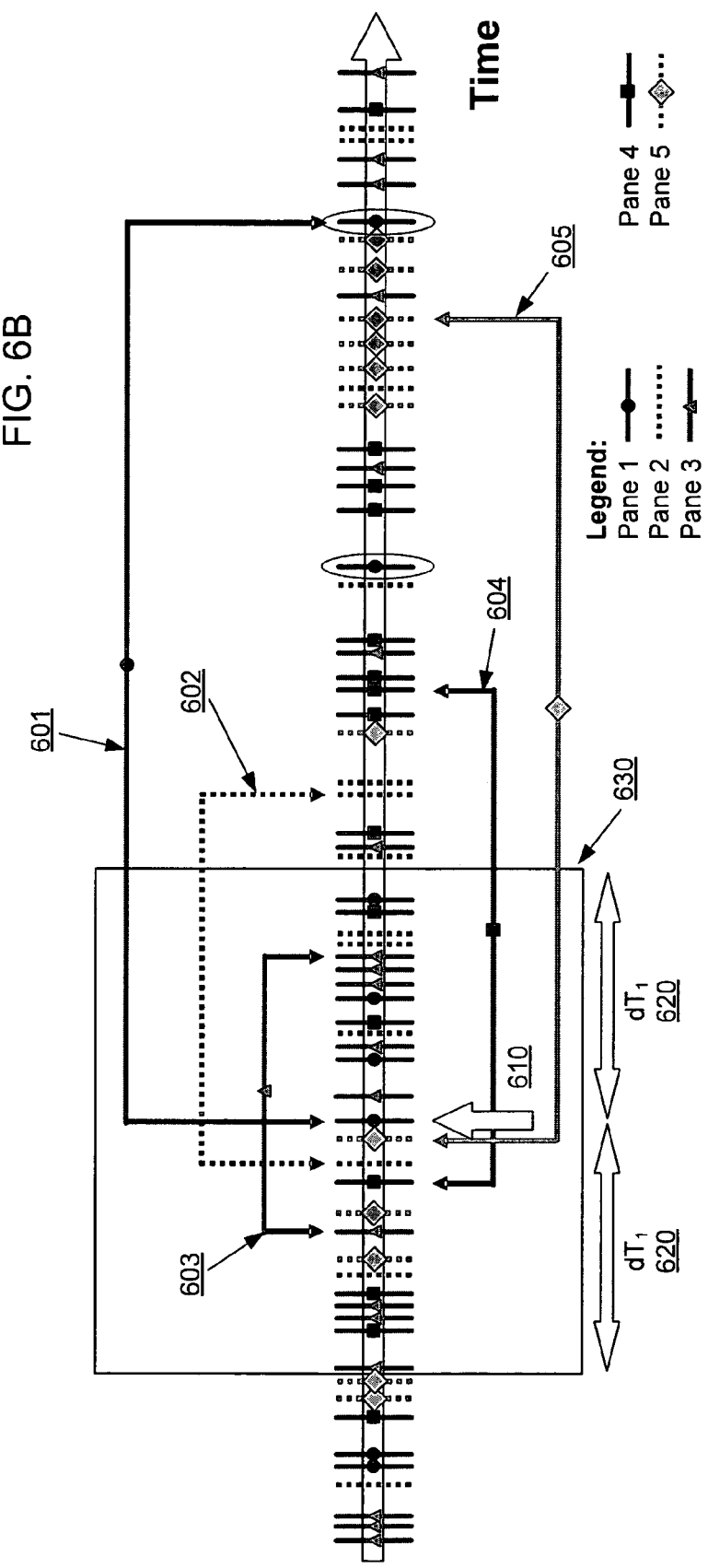
Figure 6C:
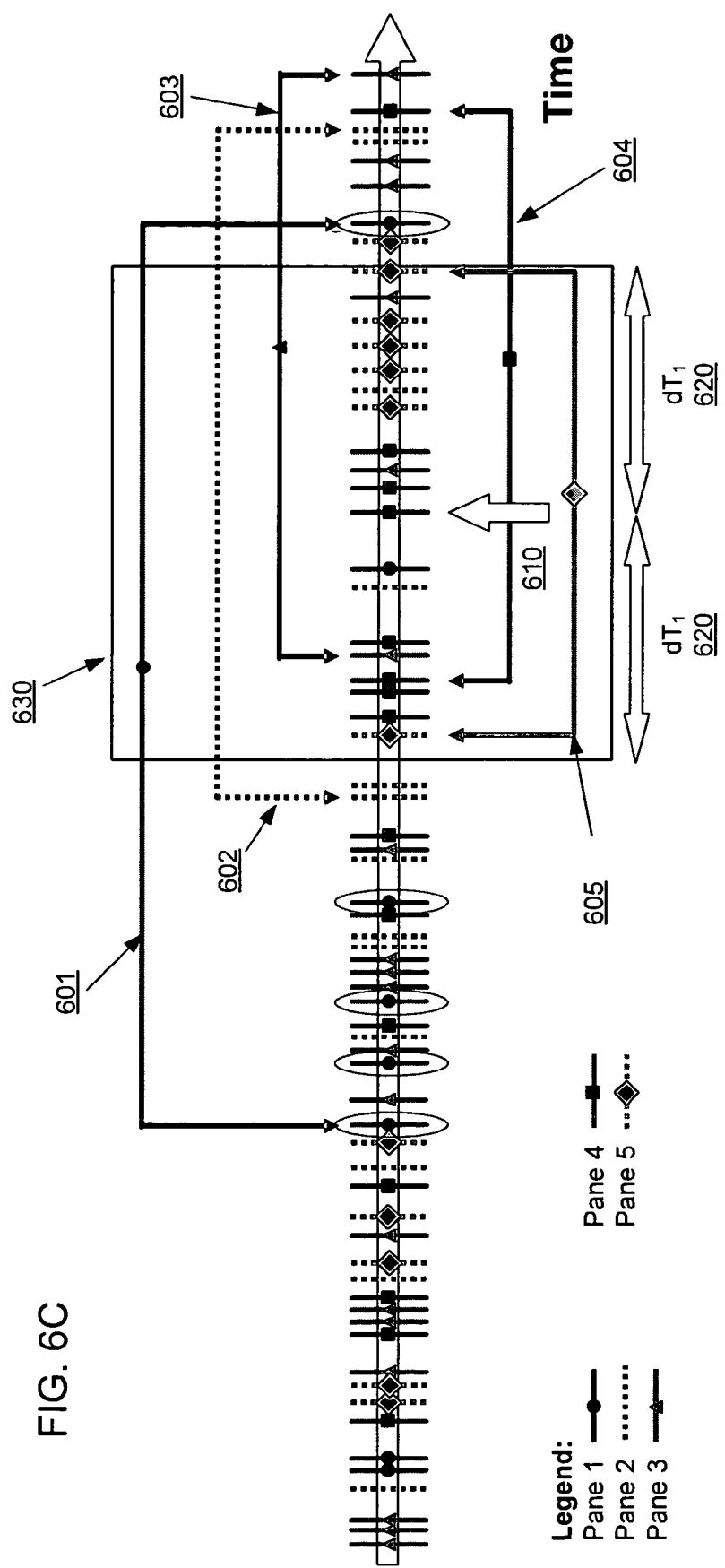
Figure 6D:
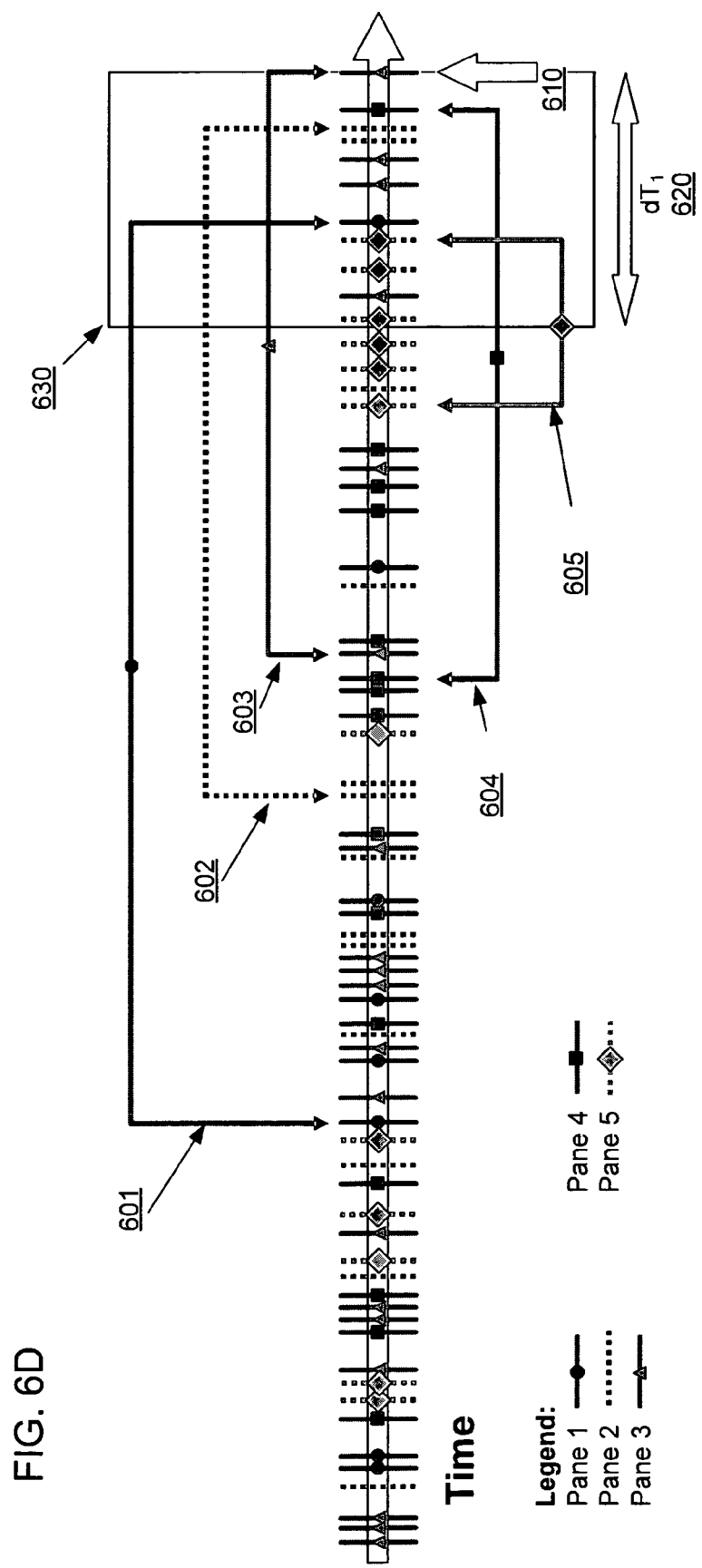

In the schematic of FIG. 6B, the reference index value has moved to the left along the index value axis. The first threshold range $dT_1$ (620) is illustrated above (newer entries) and below (older entries) the reference index value 610, with box 630 illustrating which items appear within the first threshold range. FIGS. 6C and 6D illustrate further movement of the reference index value, with the reference index value 610 reaching a limit of the extent of index values in FIG. 6D.

Figure 7:
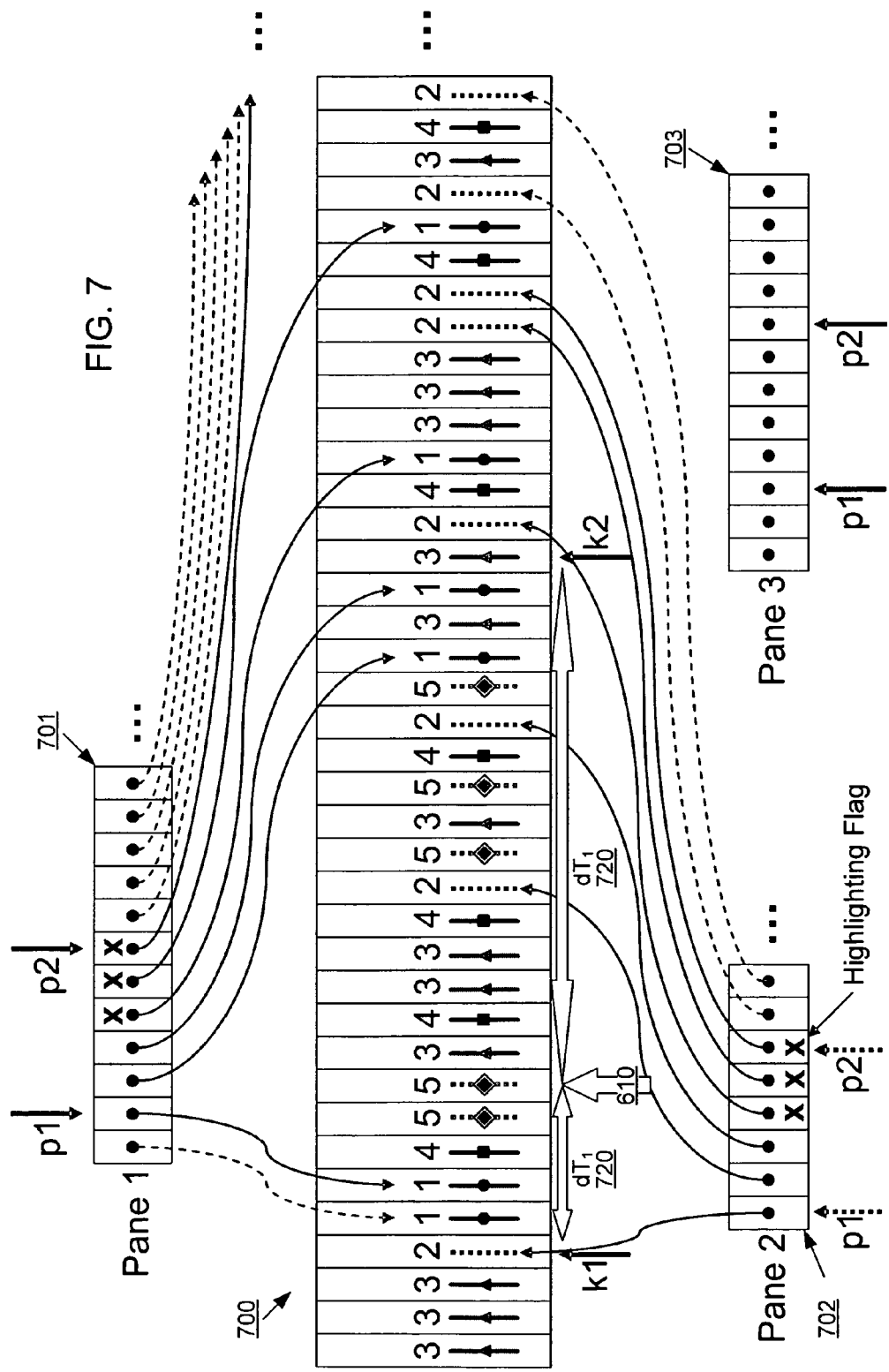
FIG. 7 displays a data structure allowing for fast update of display panes.

FIG. 7 displays a data structure allowing for fast update of the panes. The underpinnings of this data structure (i.e., without item highlighting) is explained in detail in co-pending U.S. patent application Ser. No. 11/098,958 filed 4 Apr. 2005, the explanation from which was incorporated above by reference. What has been added are time interval pointers k1 and k2 and the highlighting "x" flags.

A plurality of series of items are illustrated as entries in array 700. The time interval pointers k1, k2 mark the positions of the time interval $dT_1$ (720) around the reference index value 610. The time interval arrows 720 are not equidistant around the reference index value 610 because now the time stamps of the five of the five panes are all mapped to the array 700 with equidistant elements. Nevertheless, the index values of the array entries within the interval pointers k1, k2 are all within a same $+/-dT_1$ range around the reference index value 610. Pointers k1, k2 are repositioned each time the reference index value 610 is moved along the array (e.g., due to a scrolling event on the user interface). If no entries exist in the time axis array which as a value of the reference index value $+/-dT_1$, then the closest possible array elements having index values within the range are chosen and k1, k2 point to those array elements. Interval pointers k1, k2 point at the outermost elements that are inside the threshold range.

For each pane, an array exists which contains pointers to the time axis array elements of its type. For example, the array (701) for Pane 1 contains pointers that point only to elements in the time axis array 700 that correspond to items displayed in Pane 1. Pointers p1, p2 in the array (701) for Pane 1 indicates which lines are visible in Pane 1. If a highlighting flag is set to value "x," then the corresponding item is displayed with an appearance (e.g., displayed with a gray font color) that is different from the items without the "x" flag (e.g., displayed with a black font color).

The highlighting flag may be set to value "x" for all elements of a pane that point to currently visible lines (so only pane array elements between p1 and p2 are considered) and at the same time point to time axis array elements that lie beyond the interval defined by k1 and k2. As another approach, the highlighting flags may be set for all lines which should appear with one appearance or another, without regard to whether they are displayed.

Either activation flags or deactivation flags may be used. If there is only one threshold range, a single bit can be used. Other variations can be used if there are multiple threshold ranges. For example, a single bit may be assigned to each threshold range to indicate whether the item is inside or outside the respective range: N threshold ranges represented by N bits. For instance, if there are three threshold ranges, the appearance can be represented by three bits: "000" for items inside $dT_1$, $dT_2$, and $dT_3$ (e.g., black), "001" for times outside $dT_1$ and inside $dT_2$ and $dT_3$ (e.g., dark gray), "011" for items outside $dT_1$ and $dT_2$ and inside $dT_3$ (e.g., medium gray), and "111" for items outside $dT_1$, $dT_2$, and $dT_3$ (e.g., light gray).

As another example, a multi-bit value may be assigned to indicate the appearance of each element. For instance, if there are three threshold ranges, the appearance can be represented by two bits: "00" for items inside $dT_1$ (e.g., black), "01" for items outside $dT_1$ and inside $dT_2$ (e.g., dark gray), "10" for items outside $dT_2$ and inside $dT_3$ (e.g., medium gray), and "11" for items outside $dT_3$ (e.g., light gray).

The pointers k1, k2, p1, p2 may be, for example, pointers to a memory cell or an array index value. The pane arrays (e.g., 701, 702, 703) can be implemented as a pointer list (pointing to array 700), arrays, or vectors, utilizing either linear or sequential data structures depending upon, among other things, the programming language used.

Although the examples above include multiple panes, the item highlighting may be used with only a single pane. This could occur if, for instance, only a single file was selected in FIG. 1. This may also be useful if a series of indexed data is reviewed with other types of data or graphical representations, where all of the data or representations are organized by or keyed to a same type of index value.

It is also possible that there a pane will have space for more items than exist in a series. In this case, the extra space may be displayed as empty in the pane, or pane sizes may automatically be adjusted to reapportion the excess space from one pane to enable the display of additional items in other panes.

In the examples, each threshold range extends above and below the reference index value by a same amount (e.g., +/−20 seconds). As an alternative, the extent of the range above the reference index value may be set to a different quantity than the extent of the range below the reference index value (e.g., +10 seconds, −20 seconds).

Although time is used as the index values in the examples, the index values may be any type of index value used to order serial information.

Although the examples use trace files as the source of the series of items for analysis, any indexed serial information may be used. For example, each item of a respective series may represent an event related to a same task or computer program, and/or each item of a respective series may represent an entry in a same file or database corresponding to a different index value.

The methods described may be implemented on a computer having a storage component for storing machine-readable instructions for performing the various processes to generate the graphical user interface. The storage component may be any type of machine-readable medium (i.e., one capable of being read by a machine) such as a compact disk, flash memory, hard drive memory, floppy disk memory, DVD-ROM, CD-ROM or any type of machine readable (computer readable) storing medium. Such a computer may each also include system-addressable memory (e.g., random access memory, cache memory) to store data and/or sets of instructions that may be included within, or be generated by, the machine-readable instructions when they are executed by a processor on the computer. The computer is not limited to any particular type of computer, but rather, may be any system that generates a graphical user interface.

Although each displayed item in a series has a index value, the index value itself may not necessarily be displayed.

Scrolling may be based upon the reference index value, or may be based on the relative position of the scroll bar slider 210. In either case, however, the item highlighting is based upon the reference index value.

The features and concepts illustrated in each of the figures and examples should be understood to be complementary and interchangeable.

While the flow charts (4, 5) may illustrate a particular order, it should be recognized that the order of events can be changed while achieving the same or substantially the same results. For example, in FIG. 5, scrolling (570) may be in direct response to movement of the scroll bar slider (550), instead of in response to a change of the reference value (560).

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer system, comprising:
a display device to display a graphical user interface, and a processor, executing program instructions that operate as the graphical user interface, comprising:
a plurality of display panes, each of the plurality of display panes simultaneously displaying a different series of multiple data items retrieved from plurality of separate files, each data item having an assigned index value upon which is based a relative position of the data item within the series of data items as presented in each respective display pane, and each data item includes data indicating processes performed by one of a plurality of different processors, and
a user control element to scroll among data items displayed in a first of the display panes corresponding to a first set of data items wherein a reference index value corresponds to a position of the user control element on the displayed graphical user interface and movement of the control element is translated into a relative change in the reference index value and scrolls to a data item having an assigned index value corresponding to the reference index value, the graphical user interface causes a second display pane to scroll to a data item in a different series of data items retrieved from files different from the data items displayed in the first display pane, the data items are displayed in the second display pane based on the reference index value corresponding to the position of the user control element, wherein:
in the second display pane, for any displayed data item having an assigned index value that falls outside a threshold range of the reference index value, the graphical user interface applies a display format that differs from a display format used for displayed data items having index values that fall within the threshold range of the reference index value, and wherein
the threshold range is one of a plurality of successive index value ranges wherein, when data items with assigned index values outside of each successive range are simultaneously displayed in the second pane with data items having index values within each successive range, the graphical use interface applies a display format that differs for data items within and data items without each successive range.

2. The computer system of claim 1 wherein each file is generated by a separate data application.

3. The computer system of claim 2 wherein each data application is executing on separate hosts.

4. The computer system of claim 1 wherein, the display format that differs, differs in contrast, with data items having index values outside of each successive index value range being displayed with less contrast than data items having values inside the respective threshold range.

5. The computer system of claim 1, wherein the index value is time.

6. The computer system of claim 1, wherein the display format that differs, differs in one of displayed color, font style or a combination thereof.

7. A method comprising:
presenting a plurality of display panes, each of the plurality of display panes simultaneously displaying a different series of data items from among a plurality of data items retrieved from separate files, each data item having an assigned index value upon which is based a relative position of the data item within the series of data items as presented in each respective display pane, each data item includes data indicating processes performed by one of a plurality of different processors, and
providing a user control element to scroll among a first series of data items displayed in a first of the display panes wherein a reference index value corresponds to a position of the user control element on the displayed graphical user interface and movement of the control element is translated into a relative change in the reference index value and scrolls to a data item having an assigned index value corresponding to the reference index value, the graphical user interface causes a second display pane to scroll to a data item in a different series of data items retrieved from files different from the data items displayed in the first display pane, the data items are displayed in the second display pane based on the reference index value corresponding to the position of the user control element, and,
in the second display pane, for any displayed data item having an assigned index value that falls outside a threshold range of the reference index value, applying a display format that differs from a display format used for displayed data items having index values that fall within the threshold range of the reference index value, and wherein
the threshold range is one of a plurality of successive index value ranges wherein, when data items with assigned index values outside of each successive range are simultaneously displayed in the second pane with data items having index values within each successive range, applying a display format that differs for data items within and data items without each successive range.

8. The method of claim 7, wherein each file is generated by a separate data application.

9. The method of claim 8, wherein each data application is executing on separate hosts.

10. The method of claim 7, wherein the display format that differs, differs in contrast, data items having index values outside of each successive index value range being displayed with less contrast than data items having values inside the respective threshold range.

11. The method of claim 7, wherein the index value is time.

12. The method of claim 7, wherein the display format that differs, differs in one of displayed color, font style or a combination thereof.

13. A non-transitory machine-readable storage medium storing instructions adapted to be executed by a processor to perform a method comprising:

presenting a plurality of display panes, each of the plurality of display panes simultaneously displaying a different series of multiple data items retrieved from a plurality of separate files, each data item having an assigned index value upon which is based a relative position of the data item within the series of different data items as presented in each respective display pane, each data item includes data indicating processes performed by one of a plurality of different processors, and providing a user control element to scroll among a first series of data items displayed in a first of the display panes wherein a reference index value corresponds to a position of the user control element on the displayed graphical user interface and movement of the control element is translated into a relative change in the reference index value and scrolls to a data item having an assigned index value corresponding to the reference index value, the graphical user interface causes a second display pane to scroll to a data item in a different series of data items retrieved from files different from the data items displayed in the first display pane, the data items are displayed in the second display pane based on the reference index value corresponding to the position of the user control element, and, in the second display pane, for any displayed data item having an assigned index value that falls outside a threshold range of the reference index value, applying a display format that differs from a display format used for displayed data items that fall within the threshold range of the reference index value, and wherein the threshold range is one of a plurality of successive index value ranges wherein, when data items with an assigned index value outside of each successive range are simultaneously displayed in the second pane with data items having index values within each successive range, applying a display format that differs for data items within and data items without each successive range.

14. The machine readable storage medium of claim 13, wherein each file is generated by separate data applications.

15. The machine readable storage medium of claim 13, wherein each data application is executing on a separate host.

16. The machine readable storage medium of claim 13, wherein the display format that differs, differs in contrast, items having index values outside of each successive index value range being displayed with less contrast than items having values inside the respective index value range.

17. The machine readable storage medium of claim 13, wherein the index value is time.

18. The machine readable storage medium of claim 13, wherein the display format that differs, differs in one of displayed color, font style or a combination thereof.

19. The computer system of claim 1, wherein each data item of the respective series represents an event related to a same task or computer program.

20. The method of claim 7, wherein each data item of the respective series represents an event related to a same task or computer program.

21. The machine readable storage medium of claim 13, wherein each data item of the respective series represents an event related to a same task or computer program.

* * * * *